(12) United States Patent
Lindner et al.

(10) Patent No.: US 8,458,919 B2
(45) Date of Patent: Jun. 11, 2013

(54) SETTING DEVICE FOR ALIGNING A SHIFT TRANSMISSION

(75) Inventors: Frank Lindner, Hattersheim (DE); Thorsten Hahn, Gau-Odernheim (DE)

(73) Assignee: GM Global Technology Operations LLC, Detroit, MI (US)

(*) Notice: Subject to any disclaimer, the term of this patent is extended or adjusted under 35 U.S.C. 154(b) by 324 days.

(21) Appl. No.: 13/016,334

(22) Filed: Jan. 28, 2011

(65) Prior Publication Data

US 2011/0185587 A1    Aug. 4, 2011

(30) Foreign Application Priority Data

Jan. 30, 2010    (DE) .......................... 10 2010 006 287

(51) Int. Cl.
*G01B 5/25*    (2006.01)

(52) U.S. Cl.
USPC ............................................. 33/606; 33/645

(58) Field of Classification Search
USPC .............................. 33/288, 600, 606, 613, 645
See application file for complete search history.

(56) References Cited

U.S. PATENT DOCUMENTS

| 2,616,184 | A | * | 11/1952 | Mendro et al. | 33/606 |
| 2,930,136 | A | * | 3/1960 | Knudsen et al. | 33/606 |
| 4,422,242 | A | * | 12/1983 | Stocker | 33/600 |
| 5,930,908 | A | * | 8/1999 | Patrisso et al. | 33/600 |
| 6,948,259 | B1 | * | 9/2005 | Hatfield et al. | 33/645 |
| 7,181,852 | B2 | * | 2/2007 | Bryan | 33/288 |
| 2006/0272436 | A1 | | 12/2006 | Lein et al. | |
| 2006/0283027 | A1 | * | 12/2006 | Bryan | 3/203.18 |
| 2010/0011604 | A1 | * | 1/2010 | Vermeersch | 33/784 |

FOREIGN PATENT DOCUMENTS

DE    102008029262 A1    12/2009

OTHER PUBLICATIONS

German Patent Search Report dated Oct. 4, 2010, issued in Application No. 10 2010 006 287.1.

* cited by examiner

*Primary Examiner* — G. Bradley Bennett
(74) *Attorney, Agent, or Firm* — Ingrassia Fisher & Lorenz, P.C.

(57) ABSTRACT

A setting device for aligning a shift transmission, including, but not limited to a main bearing shaft mounted in a shift lever housing and a setting element, which can be hooked in guide means mounted on the shift lever housing, the setting element being situated along a central axis of the main bearing shaft.

9 Claims, 4 Drawing Sheets

SETTING DEVICE FOR ALIGNING A SHIFT TRANSMISSION

CROSS-REFERENCE TO RELATED APPLICATION

This application claims priority to German Patent Application No. 102010006287.1, filed Jan. 30, 2010, which is incorporated herein by reference in its entirety.

TECHNICAL FIELD

The technical field relates to a setting device for aligning a shift transmission.

BACKGROUND

A setting device is used for aligning a shift transmission, when setting a shift lever in the interior relative to the transmission in the engine compartment, of fixing the shift lever in a specific position, in order to fasten the cable, which is used as the connection between the shift lever and the transmission, on the shift lever in a specific position and a specific length to the transmission. In order to achieve optimum setting or alignment of the shift transmission, upon the attachment of the cable on the shift lever, the shift lever is to be positioned in a neutral position between the first gear and the second gear.

The setting devices known up to this point typically have a main bearing shaft, which is mounted in a shift lever housing, and a setting element provided separately there from. The main bearing shaft is typically formed from a turned steel component and has a spherical bearing head and an oblong shaft adjoining thereon, the bearing head being extrusion coated by the plastic of the shift lever housing, in order to hold the main bearing shaft in a fixed position. The setting element is situated laterally offset to the main bearing shaft, the setting element being formed from a pin-shaped element, which can execute a purely translational movement to its central axis, which is implemented parallel to the longitudinal axis of the shift lever, in order to transfer the setting element into a position in which an alignment of the shift transmission can be performed. For this purpose, the setting element can hook in guide means mounted on the shift lever housing.

Because of the spacing between the main bearing shaft and the setting element, undesired torques and error tolerances may arise upon fixing of the cable on the shift lever, whereby it may occur that the shift lever is no longer located in the exact position upon fixing of the cable, so that the shift lever is no longer located exactly between the first and second gears upon alignment of the shift transmission, but rather is slightly displaced, which can result in unpleasant blocking during later driving operation or shifting during driving operation of the motor vehicle, when the driver wishes to shift into the reverse gear if the reverse gear is adjacent to the first gear. In addition, because of the forces applied to the shift lever during the setting or fixing of the cable on the shift lever, it may occur during the alignment that the setting element can slip out of the guide means if forces are applied to the shift lever parallel to the longitudinal axis thereof.

In view of the foregoing, at least one object is therefore to provide a setting device for aligning a shift transmission, which is distinguished by improved and particularly exact alignment of the shift lever relative to the transmission situated in the engine compartment.

SUMMARY

The setting device is provided for aligning a shift transmission has a main shaft, which is mounted in a shift lever housing, and a setting element, which can be hooked in guide means mounted on the shift lever housing, the setting element being situated along a central axis of the main bearing shaft. This setting element is no longer situated offset to the main bearing shaft, but rather is situated along the central axis, the setting element preferably being situated having its central axis perpendicular to the central axis of the main shaft, the vectors of the forces absorbed by the setting element and the main shaft overlapping, so that now torques may no longer occur between the main shaft and the setting element, whereby tilting movement of the setting element relative to the main shaft may be prevented. The alignment of the shift transmission is thus distinguished by particularly high robustness and exactness, since error tolerances may be extensively avoided. It is thus possible to ensure that the shift lever is positioned exactly between the first and the second gear during alignment of the shift transmission, whereby blocking arising later during driving operation upon shifting into the reverse gear may be prevented. This results in a substantially improved driving feel for the driver.

The main bearing shaft preferably has a receptacle, in which the setting element is guided. The guiding of the setting element in a receptacle provided on the main bearing shaft allows a defined movement of the setting element relative to the main bearing shaft, whereby error tolerances and undesired play may be avoided.

In order to be able to achieve targeted guiding of the setting element relative to the main bearing shaft, the receptacle is preferably provided in the form of a recess along the central axis of the main bearing shaft. A particularly robust and rigid embodiment of the connection between the main bearing shaft and the setting element is achievable by the guiding of the setting element in the recess in the main bearing shaft.

Furthermore, it is preferably provided that the receptacle is adapted to the contour of the setting element. Through the adaptation of the shape of the receptacle to the external contour or the external peripheral surface of the setting element, particularly exact guiding of the setting element in the receptacle relative to the main bearing shaft can be achieved, the guiding being settable so precisely that error tolerances or play between the main bearing shaft and the setting element may be particularly effectively prevented.

The setting element is advantageously transferable into a first position and a second position, the setting element executing a translational movement and a rotational movement around its central axis for transfer into the first position and the second position. In the first position, the setting element is preferably plunged into the receptacle of the main bearing shaft, which is implemented as a recess, in this position, no connection preferably being provided between the shift lever or the shift lever housing and the setting element, since in this position the setting element is not hooked in the guide means on the shift lever housing. The setting element is situated in this first position in normal driving operation, so that shift operations may be executed by the driver using the shift lever. In the second position, the setting element is hooked in the guide means, so that the shift lever is located in a defined position, preferably in the neutral position between the first gear and the second gear, and an alignment of the shift transmission can be executed, preferably in the factory or a repair shop, while the motor vehicle is not in driving operation. To transfer the setting element from the first position into the second position, the setting element is first lifted out of the recess by a translational movement and hooks into the guide means on the shift lever housing. Subsequently, the setting element is preferably pivoted by approximately 90° around its central axis, so that in its second position the setting means is clamped between the guide means and the receptacle in such a way that the setting element can no longer execute a translational movement parallel to the longitudinal axis of the shift lever. In the case of the installation of the cable of the transmission on the shift lever and the forces applied parallel to the longitudinal axis on the shift lever, the setting element can thus be reliably prevented from slipping out of its fixing in the guide means, which would otherwise result in a displacement of the shift transmission during the setting of the gears of the transmission relative to the shift lever. A particularly secure and exact alignment of the shift transmission is thus possible.

It is preferably provided that the receptacle has an edge area which partially encloses the receptacle and is elevated to the surface of the receptacle. The elevated edge area extends from the receptacle in the direction of the setting element or in the direction of the guide means provided on the shift lever housing and is preferably situated along an edge of the surface of the receptacle, the edge area being situated on the receptacle in such a way that it is provided in the areas of the receptacle along which no pivot movement or rotational movement of the setting element is to occur, so that an unintended pivot movement of the setting element can be prevented using the edge area. The degree of the rotational movement of the setting element can thus be precisely predefined using the edge area. The edge area is preferably implemented as so high that the setting element can no longer be moved beyond the edge area during a rotational movement. The edge area is preferably implemented in the form of a wall.

Furthermore, it is preferably provided that the setting element is formed from a pin-shaped element and a lever element, which at least partially encloses the pin-shaped element. The pin-shaped element is preferably situated parallel to the longitudinal axis of the shift lever. The setting element can be hooked in the guide means using the pin-shaped element. The lever element is implemented in an area along the pin-shaped element, using which the setting element can be actuated to exercise a translational movement and a rotational movement. For this purpose, it is preferably provided that the pin-shaped element is formed from a metal and the lever element is formed from a plastic which at least partially encloses the pin-shaped element. The lever element can be extrusion coated around the pin-shaped element, in order to be able to implement the most solid possible connection between the pin-shaped element and the lever element.

Furthermore, it is preferably provided that the main bearing shaft is produced from an aluminum die cast. Through the formation of the main bearing shaft from an aluminum die cast, very good manufacturing precision and good surface properties may be achieved at low production costs in the case of a large piece count of the main bearing shaft.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
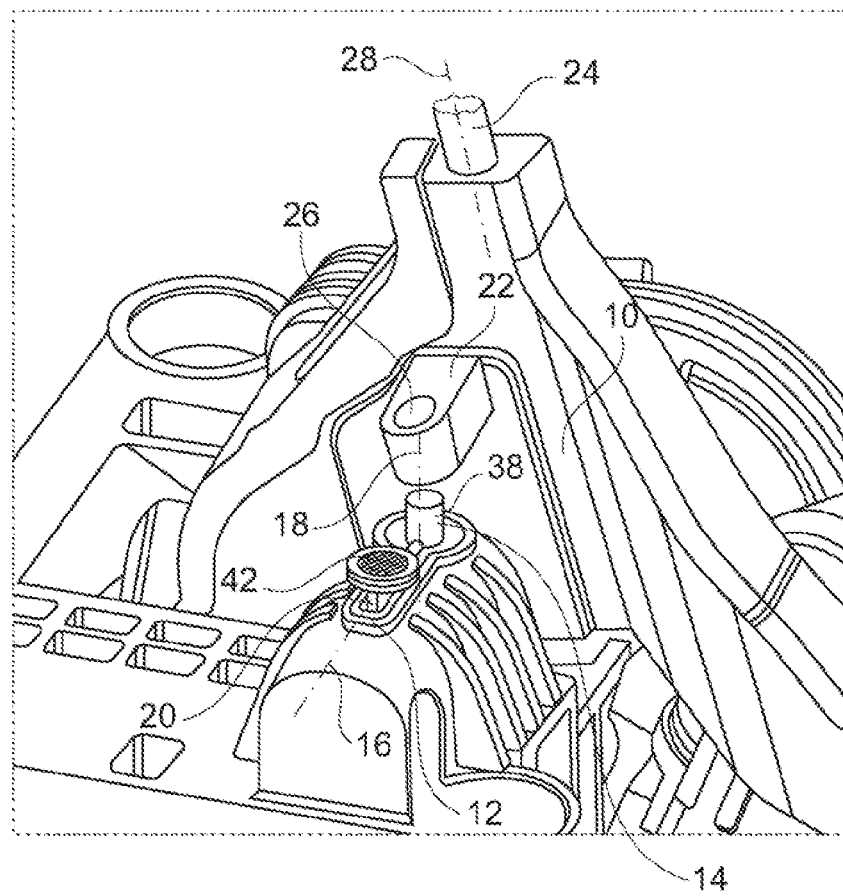
FIG. 1 shows a schematic view of the device according to an embodiment in a first position.
Figure 2:
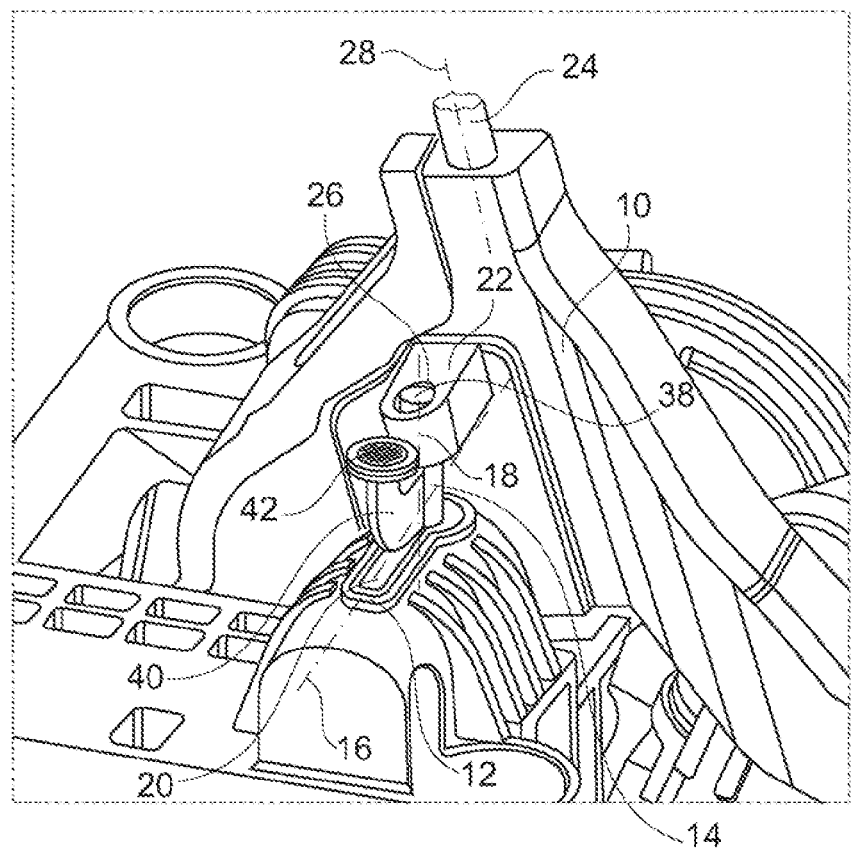
FIG. 2 shows a schematic view of the device in an intermediate position.
Figure 3:
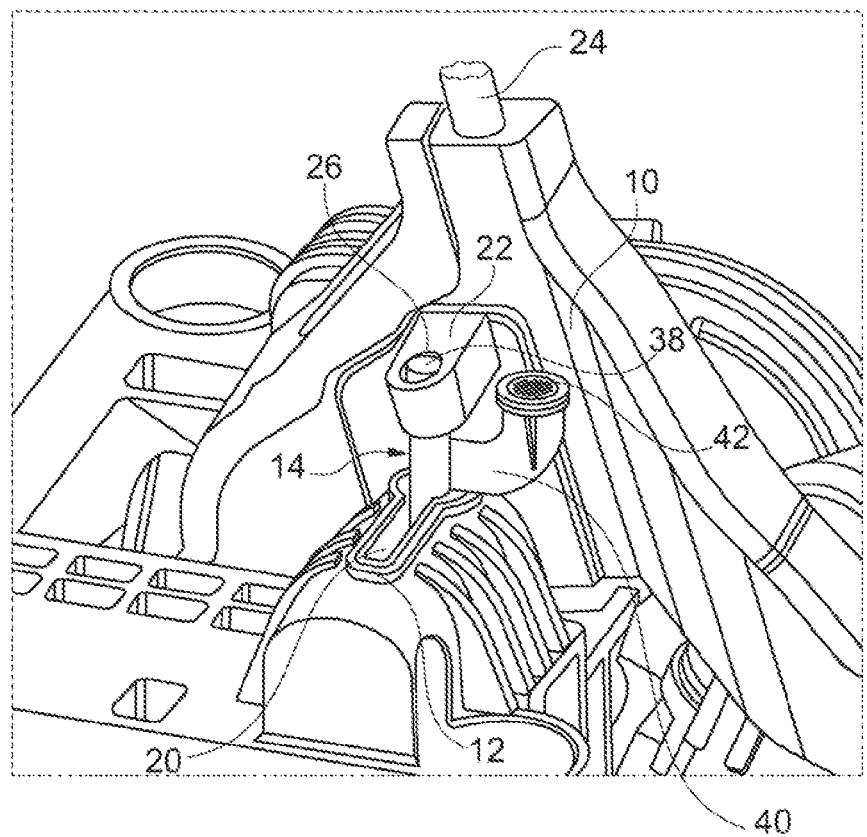
FIG. 3 shows a schematic view of the device in a second position.

FIG. 1 to FIG. 3 show a schematic view of a setting device according to an embodiment for aligning a shift transmission. The setting device has a main bearing shaft 12, which is mounted in a shift lever housing 10, and a setting element 14. The setting element 14 is situated along a central axis 16 of the main bearing shaft 12, the setting element 14 being situated having its central axis 18 perpendicular to the central axis 16 of the main bearing shaft 12.

FIG. 1 shows the setting device in a position in which the setting element 14 is situated in a first position. In this case, the setting element 14 is situated in the main bearing shaft 12 in a receptacle 20 in the form of a recess along the central axis 16 of the main bearing shaft 12. In this first position shown here, the setting element 14 is not hooked in guide means 22, which are formed on the shift lever housing 10. In this position, the shift lever 24, which is situated in the shift lever housing 10, can thus be moved freely within a shift gate (not shown here) provided in the vehicle interior, in order to be able to shift between the individual gears via the movement of the shift lever 24 in driving operation of the motor vehicle.

To align the shift transmission or to align the shift lever 24 relative to the transmission situated in the engine compartment, the setting element 14 is transferable from the first position into a second position, shown in FIG. 3, in which the shift lever 24 can be fixed in a defined position using the setting element 14.

For this purpose, the setting element 14 is first moved into an intermediate position shown in FIG. 2, in that the setting element 14 executes a translational movement along its central axis 18. The setting element 14 is moved out of the receptacle 20, which is formed as a recess, and moved upward in the direction of the guide means 22, until the setting element 14 can hooked in an opening 26 formed in the guide means 22.

From this intermediate position, the setting element 14 is moved into a second position, shown in FIG. 3, in that the setting element 14 executes a rotational movement, preferably by approximately 90°, around its central axis 18. In this second position, the setting element 14 is clamped between the main bearing shaft 12 and the guide means 22 in such a way that the setting element 14 can no longer execute a translational movement parallel to the longitudinal axis 28 of the shift lever 24. A secure fixing of the shift lever 24 in the desired position is thus possible, in order to be able to connect the shift lever 24 to cables led out of the transmission and to be able to set it appropriately, so that optimum shifting using the shift lever 24 can be ensured during later driving operation.

Figure 4:
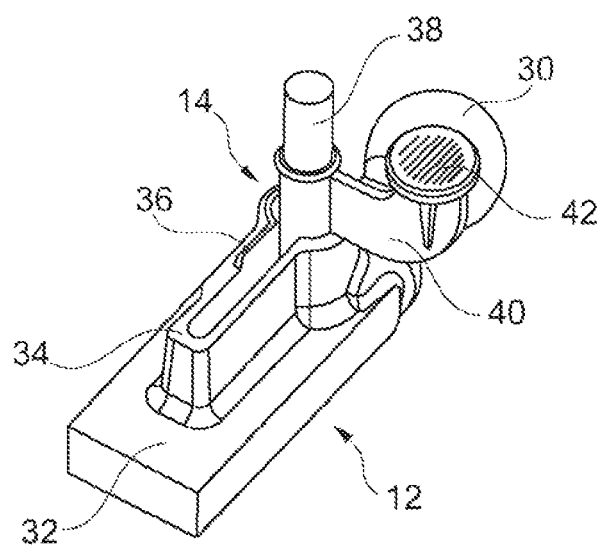
FIG. 4 shows a schematic view of the main bearing shaft and the setting element according to the invention situated therein.

FIG. 4 shows an enlarged view of a main bearing shaft 12 having a setting element 14 guided therein. The main bearing shaft 12 is produced from an aluminum die cast and has a spherical bearing head 30 and an oblong shaft 32 adjoining the bearing head 30. The bearing head 30 is preferably situated fixed in the shift lever housing 10 in the installed state. The receptacle 20, which is formed in the form of a recess, for guiding the setting element 14 is formed along the shaft 32 of the main bearing shaft 12, the contour or the side walls 34 of the receptacle 20 or the recess being adapted to the contour of the setting element 14. The side walls 34 of the receptacle 20 sectionally have an edge area 36 elevated to the surface of the receptacle 20, which limits the setting element 14 in its rotational movement. The edge area 36 is elevated enough that the setting element 14 cannot be moved beyond it.

The setting element 14 itself has a pin-shaped element 38 and a lever element 40, which at least partially encloses the pin-shaped element 38. The pin-shaped element 38 is preferably formed from a steel pin. The setting element 14 can be hooked via the pin-shaped element 38 in the opening 26 on the guide means 22. The lever element 40, which is preferably extrusion coated from a plastic material around the pin-shaped element 38, is situated on the pin-shaped element 28. Using the lever element 40, the setting element 14 can be moved into the first position and the second position, the lever element 40 having a handle 42 for this purpose, which is designed in such a way that it cannot be lowered into the receptacle 20, which is formed as a recess, so that the lever element 40 can be actuated easily at any time via the handle 42. In the first position, the handle 42 of the lever element 40 thus lies on the receptacle 20.

In order to increase the security of this setting device further, the guide means 22 preferably have a thickness which is implemented in such a way that the area of the pin-shaped element 28 of the setting element 14 which is not enclosed by the lever element 40 can be essentially completely received by the opening 26 on the guide means 22. The guide means 22 preferably have a thickness between approximately 9 mm and approximately 11 mm.

Figure 5:
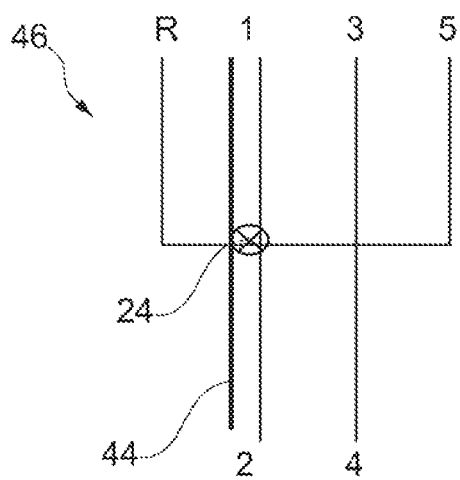
FIG. 5 shows a schematic view of a shift gate of a shift transmission, in which the shift lever is guided.

FIG. 5 shows a schematic view of a shift gate 46 of a shift transmission, in which the shift lever 24 is guided in the interior of the motor vehicle. For optimal alignment of the shift transmission, this is performed when the shift lever 24 is located in the neutral position between the first gear and the second year, the shift lever 24 being positioned, viewed from the reverse gear R toward the first gear, behind the reverse gear barrier 44, shown by the line. In this position of the shift lever 24, the setting element 14 is hooked in the guide means 22, as shown in FIG. 3, in order to be able to fix the shift lever 24 in this position, while optimum setting of the transmission situated in the engine compartment to the shift lever 24 can be performed via the cable (not shown here), which is connected to the shift lever 24 and the transmission.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A setting device for aligning a shift transmission, comprising:
   a shift lever housing;
   a main bearing shaft mounted in the shift lever housing;
   a guide mounted on the shift lever housing; and
   a setting element adapted to be hooked in the guide, the setting element situated along a central axis of the main bearing shaft.

2. The setting device according to claim 1, wherein the main bearing shaft comprises a receptacle adapted to guide the setting element.

3. The setting device according to claim 2, wherein the receptacle is a recess along the central axis of the main bearing shaft.

4. The setting device according to claim 2, wherein the receptacle is adapted to a contour of the setting element.

5. The setting device according to claim 1, wherein the setting element is transferable into a first position and a second position, the setting element adapted to execute a translational movement and a rotational movement around the central axis for transfer into the first position and the second position.

6. The setting device according to claim 2, wherein the receptacle comprises an edge area partially enclosing the receptacle and elevated to a surface of the receptacle.

7. The setting device according to claim 1, wherein the setting element is formed from a pin-shaped element and a lever element at least partially enclosing the pin-shaped element.

8. The setting device according to claim 7, wherein the pin-shaped element is at least partially formed from a metal and the lever element is at least partially formed from a plastic that at least partially encloses the pin-shaped element.

9. The setting device according to claim 1, wherein the main bearing shaft is at least partially produced from an aluminum die cast.

* * * * *